Nov. 1, 1955  E. P. KENNEDY  2,722,252
NUT CRACKING MACHINE
Filed Feb. 2, 1953  2 Sheets-Sheet 2
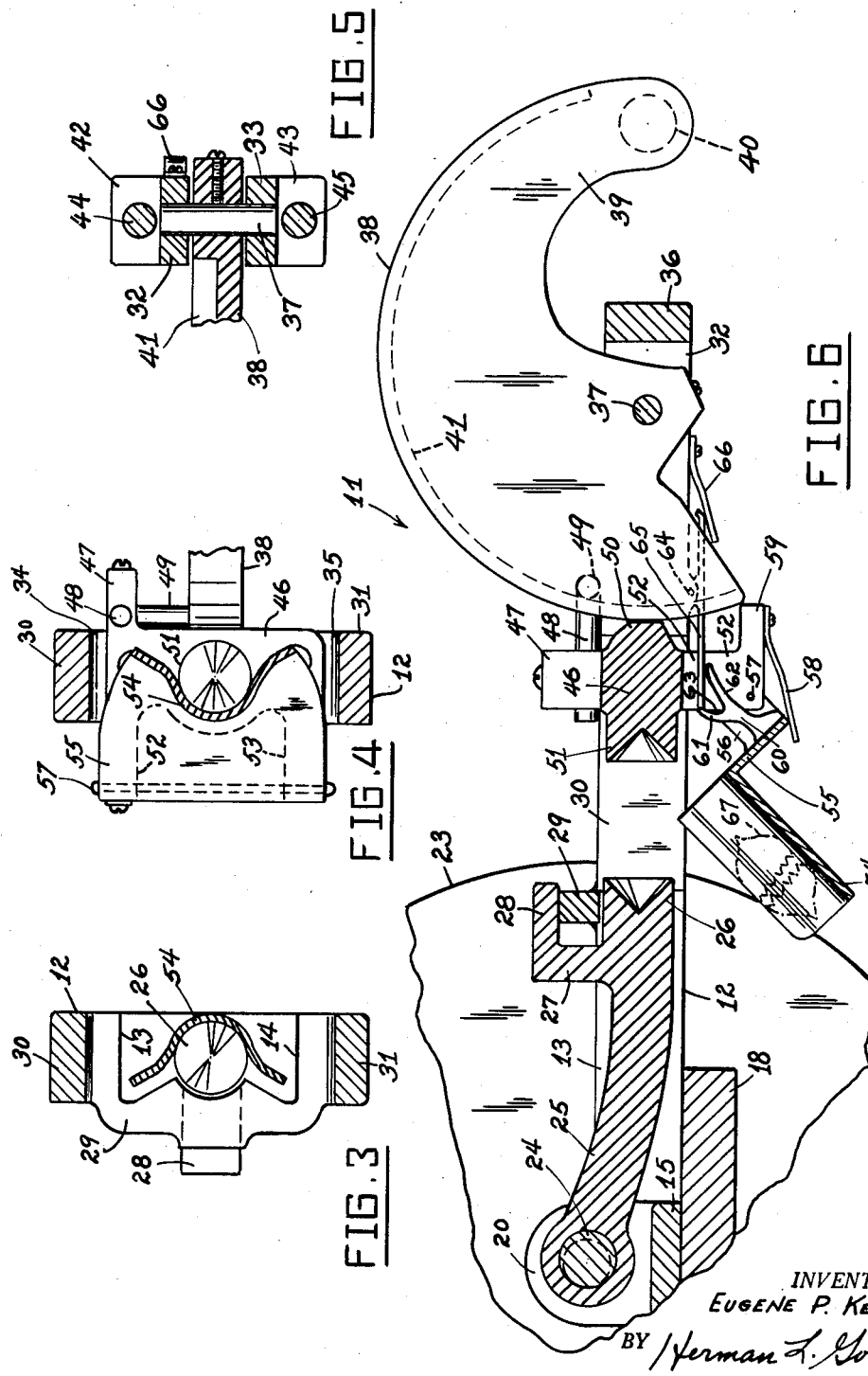
INVENTOR.
EUGENE P. KENNEDY
BY Herman L. Gordon
ATTORNEY

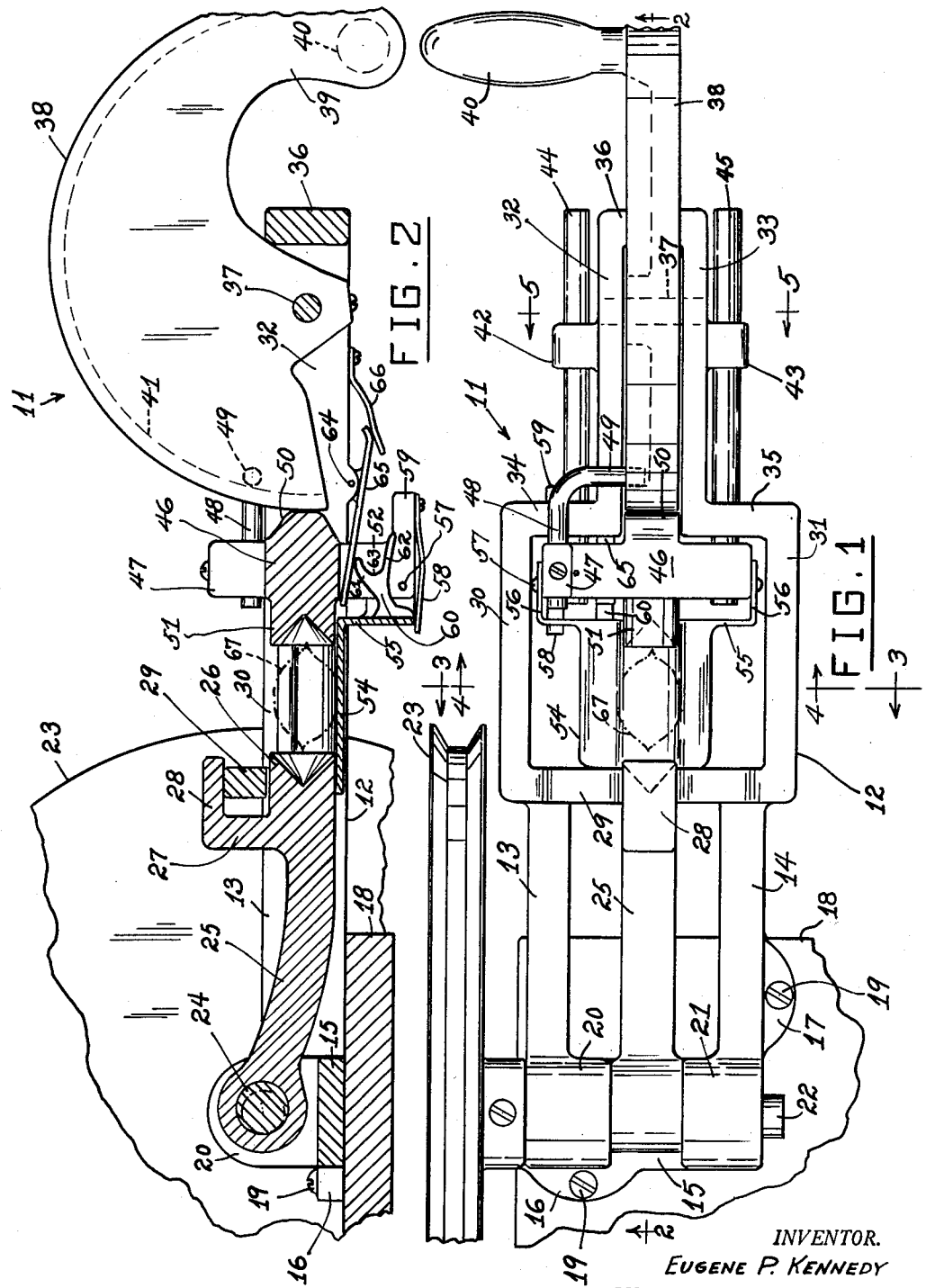

United States Patent Office 2,722,252
Patented Nov. 1, 1955

2,722,252

NUT CRACKING MACHINE

Eugene P. Kennedy, Tulsa, Okla.

Application February 2, 1953, Serial No. 334,570

3 Claims. (Cl. 146—12)

This invention relates to nut cracking machines, and more particularly to nut cracking machines of the power-driven type.

A main object of the invention is to provide a novel and improved nut cracking machine which is very simple in construction, which may be employed to crack nuts which vary widely in size and shape, and which cracks the shells of the nuts without injuring the nut meats.

A further object of the invention is to provide an improved nut cracking machine which applies cumulative, relatively short strokes of cracking pressure on the nuts, to crack the nut shells without damaging the nut meats, the machine being arranged to hold the nuts firmly for application of the repeated short compression strokes, regardless of variations in the size and shape of the nuts.

A still further object of the invention is to provide an improved nut cracking machine which is rugged in construction, which involves only a few parts, and which is inexpensive to manufacture.

A still further object of the invention is to provide an improved power-driven nut cracking machine wherein the operator may readily control the over-all cracking pressure applied to the nuts and wherein the cracking force is applied to the nuts in short, successive pulses, whereby the nut shells are cracked in a manner enabling said shells to be removed without damage to the nut meats.

A still further object of the invention is to provide an improved power-driven nut cracking machine having means for automatically discharging the cracked nuts from the machine after the nut cracking operations.

A still further object of the invention is to provide an improved power-driven nut cracking machine of the type which applies cumulative, relatively short strokes of cracking pressure on the nut, the nut being gradually forced against a reciprocating plunger by a manually controlled anvil member, the machine being equipped with means for automatically discharging the cracked nut responsive to the return motion of the anvil member after the nut has been cracked.

A still further object of the invention is to provide an improved power-driven nut cracking machine having a trough to receive the nuts to be cracked, said trough automatically discharging the cracked nuts from the machine after the nut cracking operations, thereby speeding the cracking operations.

Further objects and advantages of the invention will become apparent from the following description and claims, and from the accompanying drawings, wherein:

Figure 1 is a top plan view showing the major portion of an improved power-driven nut cracking machine constructed in accordane with the present invention.

Figure 2 is a vertical longitudinal cross-sectional view taken on line 2—2 of Figure 1.

Figure 3 is a transverse cross-sectional view taken on line 3—3 of Figure 1.

Figure 4 is a transverse cross-sectional view taken on line 4—4 of Figure 1.

Figure 5 is a transverse cross-sectional view taken on line 5—5 of Figure 1.

Figure 6 is a longitudinal vertical cross-sectional view similar to Figure 2 but showing the positions of the parts near the end of the return stroke of the manually operated anvil member of the machine.

Referring to the drawings, the machine is designated generally at 11. Said machine comprises a frame 12 having the parallel, longitudinally extending arms 13, 14, integrally connected by a transverse horizontal base plate 15. The base plate 15 is formed with an apertured lug 16, and the arm 14 is formed with a similar apertured lug 17 in the same horizontal plane as lug 16. The frame 12 is secured to the corner portion of a supporting table 18 by suitable fastening members 19 extending through said apertured lugs.

Integrally formed on the ends of the arms 13 and 14 are the upstanding bearing lugs 20 and 21 in which is journalled the transverse shaft 22. Secured on the end of the shaft 22 is the relatively large V-belt pulley 23 which is coupled by a suitable belt, not shown, to a smaller pulley on the shaft of an electric motor for rotating shaft 22, as in applicant's copending application, Serial No. 142,573, filed February 6, 1950, issued as U. S. Patent No. 2,640,519, June 2, 1953.

Shaft 22 is provided between lugs 20 and 21 with an eccentric portion 24 on which is rotatively engaged the end of a plunger member 25. The opposite end of plunger member 25 is formed with the conically recessed head portion 26 and with the upstanding arm 27 adjacent said head portion. Arm 27 is formed with the forwardly extending finger element 28 which is slidably supported on a transverse bar element 29 integrally formed on the arms 13 and 14 and extending between finger element 28 and head portion 26.

Arms 13 and 14 are outwardly offset at 30 and 31 and are formed with the inwardly offset forward end portions 32 and 33 connected to the outwardly offset portions 30 and 31 by the respective transverse elements 34 and 35. The ends of the inwardly offset arm portions 32 and 33 are integrally connected by a transverse frame element 36.

Journalled in the parallel arm portions 32 and 33 is a transverse shaft element 37 on which is secured the large eccentric cam 38. Cam 38 is provided at its outer end with an extension 39 to which is secured the outwardly projecting handle 40.

Cam 38 is formed with the peripheral flange 41. The arm portions 32 and 33 are formed with the outwardly projecting lugs 42 and 43. Designated at 44 and 45 are longitudinally extending, parallel guide rods which are slidably supported in suitable longitudinal bores provided in the transverse frame elements 34, 35 and in the lugs 42, 43. Designated at 46 is an anvil member extending transversely between the outwardly offset arm portions 30 and 31 and secured to the ends of the guide rods 44 and 45. Anvil member 46 is formed adjacent arm portion 30 with the upstanding lug 47. Secured in said lug 47 is an L-shaped rod member 48 having the inwardly projecting finger portion 49 which engages inside the peripheral flange 41 of eccentric cam 38.

Anvil member 46 is formed with the rounded, tapered end portion 50 which is in sliding abutment with the peripheral surface of cam 38. Said anvil member is formed at its opposite end with the conically recessed head element 51 which is longitudinally aligned with and which opposes the conically recessed head element 26 of the plunger member 25.

It will be apparent that anvil member 46 will be moved toward the reciprocating plunger member 25 responsive to counterclockwise rotation of the eccentric cam 38, as viewed in Figure 2, and that said anvil member will be retracted responsive to return rotation of said cam 38.

Anvil member 46 is formed with the respective depending arms 52 and 53 adjacent the respective frame portions 30 and 31. Designated at 54 is a trough member having the depending transverse flange 55 at one end thereof. Flange 55 is formed at its ends with the lugs 56, 56 which receive the arms 52, 53 therebetween and are pivotally connected thereto by a transverse pin 57, whereby the trough member 54 is pivotally supported for swinging movement around the transverse axis defined by said pin. Said trough member is biased upwardly toward the position thereof shown in Figure 2 by a leaf spring 58 secured to a lug 59 formed on the lower end of depending arm 52, said spring engaging the bottom edge of the trough flange 55.

Rigidly secured on the flange 55 inwardly adjacent the arm 52 is a lug 60 formed with the respective divergent fingers 61 and 62 defining therebetween a notch 63. Pivoted at 64 to the bottom of frame arm 32 is a pawl lever 65 which at one end thereof overlies and engages the finger 61, in the position shown in Figure 2. Lever 65 is biased counterclockwise, as viewed in Figure 2, by a leaf spring 66, said leaf spring 66 underlies the forward end of pawl lever 65 and is secured to the bottom edge of frame arm 32.

It will be apparent that rotation of pulley 23 will cause plunger member 25 to reciprocate longitudinally in the frame 12. The eccentric portion 24 is greater in diameter than the shaft 22 by a relatively small amount, so that the stroke of plunger member 25 is relatively short. The conically recessed head 26 of the plunger member is spaced from the conically recessed head 51 of the anvil member 46 by a distance suitable for receiving nuts therebetween, the nuts being receivable in the trough 54 which normally underlies the space between the conically recessed heads.

In operation, with the machine in the position of Figure 2, a nut 67 is dropped in the trough 54 between the opposing conically recessed heads 26 and 51. The handle 40 is elevated to move the anvil 46 toward the nut so that the nut is gripped in the conical recesses of said heads. The plunger member 25 meanwhile is reciprocating and applies repeated short pressure strokes to the nut. As the handle 40 is further elevated, the force applied to the anvil 46 is gradually increased and the repeated short-stroke impacts of the plunger rod 25 cause the nut to be cracked without crushing the nut meat. As the anvil is moved to the end of its pressure stroke, the end of lever 65 slips downwardly past the finger 61 into the notch 63. When the nut shell is cracked, the operator retracts the anvil by moving handle 40 downwardly, whereby flange 41 exerts retractile force on the finger 49. During the retractile movement of the anvil 46, the trough 54 is rotated counterclockwise, as viewed in Figures 2 and 6, by the abutment of the end of pawl lever 65 against the finger 61. Thus, the trough is rotated to the position shown in Figure 6, allowing the cracked nut 67 to slide downwardly and out of the trough into a suitable receptacle disposed below the machine. As the anvil approaches its fully retracted position, the end of pawl lever 65 slips over the end of finger 61, releasing the trough, whereby spring 58 returns said trough to the normal position thereof, shown in Figure 2.

It will be noted that the nuts are cracked by the combined pressures provided by the cam 38 and the reciprocating plunger member 25. Continuous hand pressure is applied by handle 40, which tightens the anvil head 51 against the nut 67, allowing the cam 38 to rotate a little on each back stroke of the plunger member. The short forward stroke of the plunger member thus occurs with the nut tightly wedged between the heads 26 and 51.

It will be further noted that the plunger 25 rocks as well as reciprocates, due to the rotation of the eccentric element 24, the arm 23 pivoting and sliding on the transverse bar element 29. The rocking action of the head portion 26 helps to prevent the cracked nuts from sticking at their ends in the conical recesses.

The machine above described is of particular value in shelling nuts having a relatively elongated shape, such as pecans.

The cracking plunger 25 has a relatively short stroke, which may be of the order of one sixteenth of an inch. In the machines of the prior art, the cracking stroke is frequently at least one quarter of an inch long, which requires more power than the machine of the present invention, and which introduces a greater possibility of cracking the nut excessively and thereby crushing or otherwise damaging the nut meats.

As is shown in Figures 2 and 6, sufficient clearance is provided between the transverse bar element 29 and the subjacent plunger head 26 to allow the plunger 25 to oscillate as well as to reciprocate in response to the rotation of the eccentric portion 24 of shaft 22.

While a specific embodiment of a nut cracking machine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a machine of the type having a frame, a member movably mounted on said frame, and a trough pivoted to said member, means for rotating said trough comprising pawl means pivoted to the frame and extending toward the trough, abutment means on the trough normally underlying said pawl means, means operatively associated with the trough to release said pawl means for limited downward movement responsive to the movement of said member in one direction to a predetermined position, and further means associated with the trough whereby said pawl means engages said abutment means to cause rotation of the trough when the member is thereafter moved in the opposite direction.

2. In a machine of the type having a frame, a member movably mounted on said frame, and a trough pivoted to said member, means for rotating said trough comprising a pawl member pivoted to the frame and extending toward the trough, spring means biasing said pawl member downwardly, an abutment element mounted on the trough normally underlying said pawl member, means releasing said pawl member for limited downward movement relative to the end of said abutment element responsive to the movement of said first-named member in one direction to a predetermined position, and means on said pawl member engageable with said abutment element to cause rotation of the trough when the first-named member is thereafter moved in the opposite direction.

3. In a machine of the type having a frame, a member movably mounted on said frame, and a trough pivoted to said member, means for rotating said trough comprising a pawl member pivoted to the frame and extending toward the trough, spring means biasing said pawl member downwardly, an abutment element mounted on the trough normally underlying said pawl member, said abutment element being formed with a notch at its end portion adjacent said pawl member formed and arranged to release said pawl member for limited downward movement responsive to the movement of said first-named member in one direction to a predetermined position, and means on said pawl member engageable with said notch to cause rotation of the trough when the first-named member is thereafter moved in the opposite direction.

References Cited in the file of this patent

UNITED STATES PATENTS

| | | |
|---|---|---|
| 1,038,229 | Suzzi | Sept. 10, 1912 |
| 1,165,107 | Lund et al. | Dec. 21, 1915 |
| 1,767,917 | Demek | June 24, 1930 |
| 1,973,395 | Schreiber | Sept. 11, 1934 |
| 2,065,376 | Kidd | Dec. 22, 1936 |
| 2,114,243 | Whitehead et al. | Apr. 12, 1938 |
| 2,640,519 | Kennedy | June 2, 1953 |